UNITED STATES PATENT OFFICE.

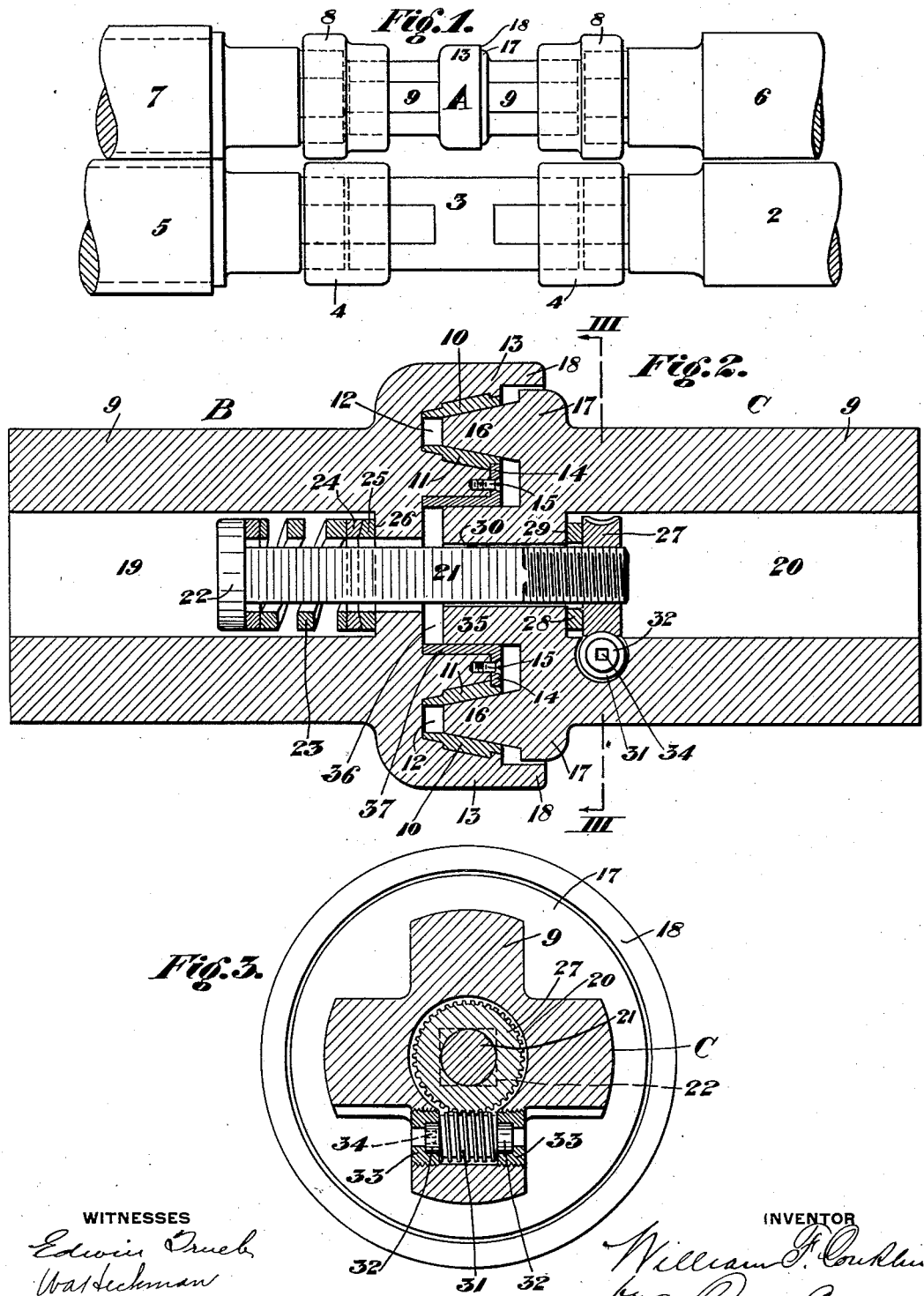

WILLIAM F. CONKLIN, OF TARENTUM, PENNSYLVANIA.

CLUTCH.

1,198,421.  Specification of Letters Patent.  Patented Sept. 19, 1916.

Application filed March 22, 1916. Serial No. 85,864.

*To all whom it may concern:*

Be it known that I, WILLIAM F. CONKLIN, a citizen of the United States, residing at Tarentum, in the county of Allegheny and State of Pennsylvania, have invented certain new and useful Improvements in Clutches, of which the following is a specification.

My invention consists of an improvement in friction clutches, and is designed for the purpose of providing a yielding connection between a driving and a driven element, capable of accurate adjustment as to the frictional resistance interposed between said elements, for accomplishing the desired objects of such mechanism.

In the application of the device I utilize interfitting frictional members and mechanism for maintaining them in variable frictional engagement, one preferred form of the construction being illustrated in the accompanying drawings, in which—

Figure 1 is a view in elevation, showing the application of the invention to the rolls of a rolling mill. Fig. 2 is a longitudinal sectional view, enlarged, of the operative mechanism of the clutch. Fig. 3 is a cross sectional view on the line III, III of Fig. 2.

While the device is applicable to various and different uses and in connection with different mechanism, one of the applications in which I have found it especially useful is in connection with the ordinary idle member of a roll train, in which case but one of the rolls is positively driven, the other co-acting roll being actuated by frictional engagement with the article being rolled, or with the driving roll itself. In such cases, the inertia of the idle roll is such as to result in a considerable degree of slippage at the initial impact with the article being rolled, as a plate, and a very considerable degree of loss of power in overcoming the inertia of the idle roll at the commencement of the operation. Such a train of rolls is illustrated in Fig. 1, in which the active, positively driven roll 2 is coupled by the usual spindle 3 and boxes 4, 4, with the end of the journal of a driven pinion 5, geared with the engine or other suitable prime mover. For the purpose of imparting corresponding motion to the co-acting companion roll 6, which is ordinarily spaced apart from the other roll 2 for passage of the blank, I utilize a co-acting gear 7, intermeshing with gear 5, and which is coupled by boxes 8, 8, to roll 6 through intervening friction clutch mechanism, indicated generally by the letter A. Such clutch mechanism comprises the two main interengaging members B, C, each of which is provided at its outer end with a spindle terminal 9 having the usual wings or pods adapted to interengage and provide the usual loose coupling connection with the coupling boxes 8, 8, as clearly shown in Fig. 1.

Member B, which may be the female member, is provided with an annular receiving cavity for the interfitting male portion of member C, such cavity being lined on the outside and inside with friction material 10, 11, respectively, consisting of a continuous annular band of fiber, metal, leather, or other suitable substance. Each of said bands 10 and 11 is preferably interlocked within the tapering receiving cavity 12 of head 13 of member B, the walls of said cavity being inclined outwardly and inwardly, as shown, in opposite directions, whereby to provide for corresponding divergence of the inner faces of the friction bands 10 and 11. As will be observed, ample clearance is provided at the inner portion of cavity 12 and outwardly beyond the liners 10 and 11 for approachment of one main friction member toward the other in taking up wear without binding. Said bands are fixedly held within the cavity by annular retaining shoulders as shown and an annular plate 14, or other suitable means, whereby they may be easily inserted and removed, as will be readily understood. Thus, the outer band 10 may be split to facilitate its insertion, and the inner band 11 may be solid, if desired, ring 14 being removable and held in position by screws or bolts 15.

Male member C is provided with an interfitting co-acting annular friction ring 16 extending beyond the head 17, and snugly interfitting between the friction linings of the cavity member B, which member may have an overlapping inclosing shell extension 18, whereby to exclude any foreign matter from the active elements of the clutch. Each member is centrally chambered, as at 19 and 20 respectively, and for the purpose of providing means for applying frictional engagement between the two main members, I utilize a centrally arranged squared stem or bolt 21 having a head 22 engaging the outer end of the helical spring 23 which is mounted in chamber 19 and bears inwardly by its other end against one of a pair of bearing washers 24, 25, the inner one of which bears against shoulder 26 of the head. Washers 24, 25 have male and female meeting faces, one projecting by its crowned surface into a corresponding recess in the other. The washers and spring are maintained in position around the squared stem 21, with just sufficient clearance to provide for easy movement. Stem 21 is squared for its main body portion and is threaded at its other end and engages a worm wheel 27, a bearing washer 28 being preferably provided between the worm wheel 27 and a bearing shoulder 29 of head C at the inner end of chamber 20. The squared stem 21 has a non-rotatable slidable engagement within a squared receiving opening 30 in extension 35 of head 17.

For the purpose of actuating worm wheel 27 and stem 21, to tighten or loosen the tension of spring 23, I provide a worm 31 mounted by its journal terminals 32, 32, in bushings 33, 33, which are inserted in any suitable manner in the head C, as into the faces of one of the spindle wings thereof, as clearly shown in Fig. 3. Worm 31 is provided at one or both end swith a key socket 34, or if preferred, with a stud, by which it may be actuated in either direction by a suitable key, as will be really understood. Member C is likewise preferably provided with a central extension 35 interfitting within a co-acting receiving socket 36 in member B, a bushing member 37 being provided, if desired, whereby to centralize the members and provide for their relative rotation, the one about the other, depending upon the degree of their frictional engagement.

The construction and operation of the device will be readily understood and appreciated from the foregoing description. In its application to a rolling mill, as in Fig. 1, the ordinarily idle roll 6 will be rotated when the mill is not acting on a blank, at or about the same rate as roll 2, depending upon the diameters of said rolls and of the actuating gearing 5, 7. These elements, it may be understood, may vary more or less, especially when the rolls are dressed down from time to time, as is the usual practice, the object, however, being to maintain the roll 6 in rotation during rotation of the active roll 2, and at approximately the same speed. The clutch members being in frictional engagement to the desired degree, will allow for any necessary slippage, so that when the blank is introduced between the rolls, roll 6 may be slightly retarded or accelerated, so as to exactly correspond to the rate of peripheral travel of roll 2, without any material degree of initial slippage or initial expenditure of energy in bringing the roll up to the desired degree of momentum. A further material advantage is that the coupling boxes 4 are relieved from unnecessary strain, by reason of the gearing 5, 7, and the direct transmission of the driving power therethrough to idle roll 6, rather than by the previously utilized friction driven power of roll 2.

It will be readily understood that the invention may be variously utilized or applied to other mechanism for imparting motion through intervening clutch mechanism, and that it may be variously changed or modified by the skilled mechanic in different details or features of construction, but that all such changes are to be considered as within the scope of the following claims.

What I claim is:

1. Clutch mechanism comprising interfitting male and female friction members, an innermost centrally arranged tightening and loosening stem, a cushioning spring engaging said stem and exerting pressure toward one of said members, and means within the interior of one of said members for adjusting the stem.

2. Clutch mechanism comprising interfitting male and female friction members, an interior centrally arranged tightening and loosening stem, a cushioning spring engaging said stem and exerting pressure toward one of said members, and means for adjusting the stem comprising worm gearing engaging the stem by its threaded end.

3. Clutch mechanism comprising interfitting male and female friction members, a centrally arranged tightening and loosening stem, a cushioning spring engaging said stem and exerting pressure toward one of said members, means for adjusting the stem, comprising a worm wheel engaging the end of said stem, and a worm engaging said worm wheel provided with means for applying turning movement to said worm.

4. In a friction clutch, the combination of a female member having an annular flaring cavity, a male member having a corresponding frictional element operable therein, a bolt extending centrally through both of said members, a spring interposed between one of said members and said bolt, and means within the interior of one of said members for tightening and loosening said bolt.

5. In a friction clutch, the combination of a female member having an annular flaring cavity, a male member having a corresponding frictional element operable therein, a bolt extending centrally through both of said members, a spring interposed between one of said members and said bolt, and means for tightening and loosening said bolt consisting of worm gearing mounted in one of said friction members adapted to be actuated from the exterior thereof.

6. In clutch mechanism of the class described, the combination of interfitting male and female friction members, and means arranged centrally within the interior of said members and completely inclosed thereby for adjusting one toward the other embodying a cushioning spring.

7. In clutch mechanism of the class described, the combination of interfitting male and female friction members, and means arranged centrally within the interior of said members and completely inclosed thereby for adjusting one toward the other comprising a bolt having a terminal head, a spring interposed between said bolt head and one of the friction members, and means for tightening and loosening said bolt.

8. In clutch mechanism of the class described, the combination of interfitting male and female friction members, and means arranged centrally within the interior of said members for adjusting one toward the other comprising a bolt having a terminal head and threaded at its other end, a spring interposed between said bolt head and one of the friction members, and gearing mounted in the other friction member and engaging said threaded end.

9. In clutch mechanism of the class described, the combination of interfitting male and female friction members, and means arranged centrally within the interior of said members for adjusting one toward the other comprising a bolt having a terminal head and threaded at its other end, a spring interposed between said bolt head and one of the friction members, and worm gearing engaging said threaded end and operable from the exterior.

In testimony whereof I hereunto affix my signature in the presence of two witnesses.

WILLIAM F. CONKLIN.

Witnesses:
W. A. HECKMAN,
C. M. CLARKE.